Feb. 3, 1959     G. A. ROWLS ET AL     2,872,499
VENT PLUG AND METHOD OF USING SAME
Filed Nov. 12, 1957
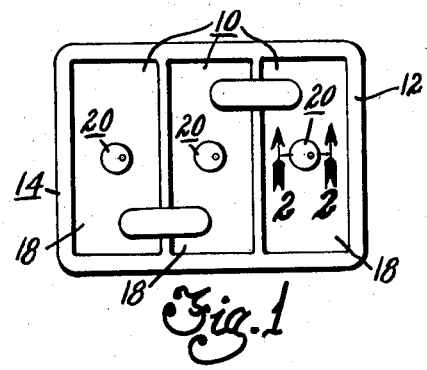
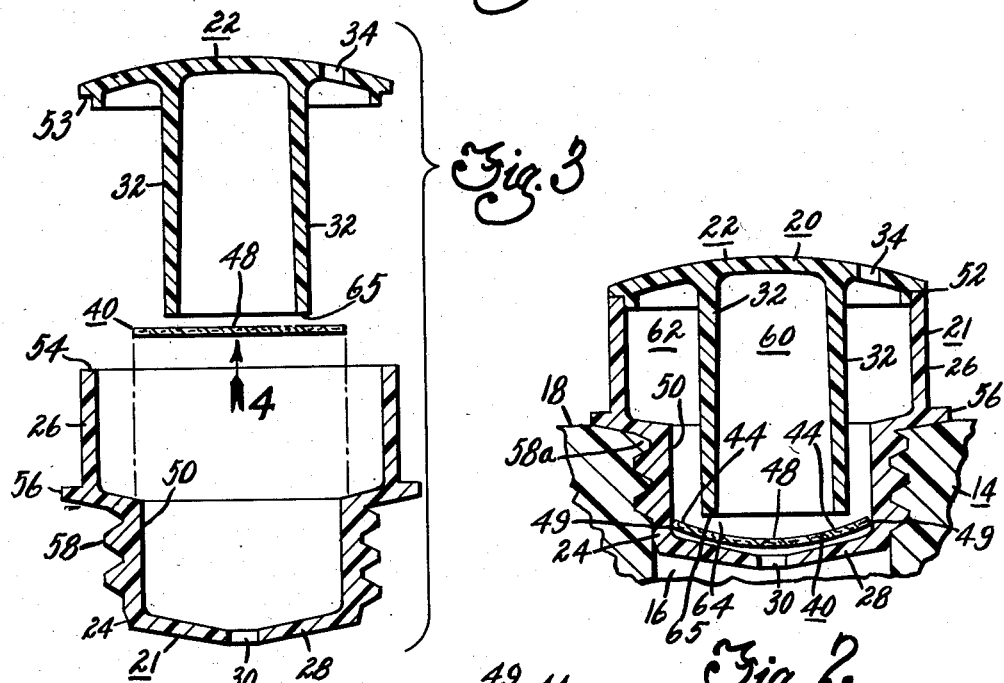
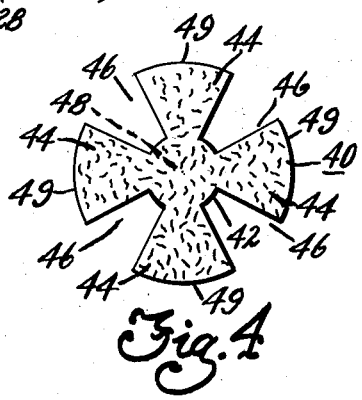
INVENTORS
GARTH A. ROWLS
DON G. TOWNSEND
BY *John T. Marvin*
THEIR ATTORNEY

United States Patent Office 2,872,499
Patented Feb. 3, 1959

2,872,499

VENT PLUG AND METHOD OF USING SAME

Garth A. Rowls, Muncie, and Don G. Townsend, Anderson, Ind., assignors to General Motors Corporation, Detroit, Mich., a corporation of Delaware Application November 12, 1957, Serial No. 695,664

7 Claims. (Cl. 136—177)

This invention relates to dry charge batteries and in particular to a vent plug and method of use therefor during shipment and storage to protect dry charge batteries for subsequent filling and use with electrolyte and liquid in cells.

An object of this invention is to provide a new and improved vent plug having protecting means required during shipment and storage of dry charge batteries and eliminated through subsequent filling and use of electrolyte inside cells of the battery without requiring a special removal operation for the protecting means.

Another object of this invention is to provide a method of sealing and protecting a battery for shipment and storage prior to filling cells of the battery with electrolyte.

Another object of this invention is to provide a vent plug of moldable acid-resistant material assembled with a hole-sealing member of a material disintegrated by acid for use in a dry-charge-type of battery shipped and stored in a dry condition protected against humidity, moisture and foreign material such as dust or metallic elements that may enter cells and deteriorate the battery, and its plate structure prior to wet use thereof.

A further object of this invention is to provide a vent plug of moldable acid-resistant material comprising a cup-like lower portion rigidly attached to an upper cap portion having an exhaust aperture located outwardly of a baffle extending downwardly in close proximity to the base of the lower portion to form a unitary structure having inner and outer chambers, and which includes an intake aperture located in a base of the lower portion initially covered by a disc of cellulose filter-paper-type material that disintegrates due to fumes and/or acid splashed from cells of a dry charge battery which is filled with electrolyte after dry shipment and storage without detriment to the battery due to ingress of humid atmosphere blocked by the disc serving as a moisture barrier.

Another object of this invention is to provide a method of sealing a dry charge battery using a vent plug of moldable acid-resistant plastic material such as polyethylene, hard rubber, or polystyrene, colored if desired and assembled containing a moisture barrier of cellulose material which disintegrates without a special removal operation after electrolyte is filled into cells of the dry charge battery protected during shipment and storage subsequent to manufacture of the dry charge battery wherein the cells are heated and dried out and are susceptible to deterioration due to humid atmosphere blocked out by the cellulose material barrier as cooling occurring inside the cells assures positive vent sealing due to greater outside atmospheric pressure against one side of the barrier.

A further object of this invention is to provide a vent-plug hole-sealing member of cellulose material that disintegrates due to fumes and/or acid splashed from electrolyte-filled cells of a dry charge battery and that acts as a humidity restrictor for battery vent plugs containing the member inserted for shipment and storage of the dry charge battery protected from high ambient humidity prior to wet use of the battery, the member being adapted to prevent bubbling and hole-clogging after electrolyte has been filled into the cells for wet use of the dry charge battery.

Further objects and advantages of the present invention will be apparent from the following description, reference being had to the accompanying drawings wherein preferred embodiments of the present invention are clearly shown.

In the drawings:

Figure 1 is a top plan view of a dry charge storage battery equipped with a vent plug having a moisture barrier used in accordance with the present invention.

Figure 2 is an enlarged, fragmentary cross-sectional elevational view taken along line 2—2 of Fig. 1.

Figure 3 is an exploded sectional view of a vent plug having a hole-sealing barrier member as shown assembled in Fig. 2.

Figure 4 is a plan view of the hole-sealing member shown in Figures 2 and 3.

Recently developed dry charge batteries are manufactured and shipped for storage in a dry condition requiring humid atmosphere and foreign matter such as dust to be kept from interiors of cells containing plates known to deteriorate or to suffer damage affecting battery efficiency and life if not protected prior to filling of the cells with acid or electrolyte when the battery is to be put in use. Such a dry charge battery as shown in Fig. 1 includes a plurality of cells 10 which are electrically connected and contained in a case 12 to form a completed battery generally indicated by numeral 14. Each cell includes a filler opening 16 located in a cell cover 18 as shown in Fig. 2 through which water and/or acid is filled into the cell. Each cell of the dry charge battery must be kept dry during shipment and storage prior to filling electrolyte thereto when the battery is to be installed for use on a motor vehicle and each cell customarily is provided with a vent cap or plug generally indicated by numeral 20 illustrated in the drawings.

In the present invention the vent plug is as shown in Fig. 2 and comprises a lower cup-like portion 21 and an upper inverted dish-shaped cap portion 22. Lower cup-like portion 21 has a lower barrel portion 24, an upper enlarged cylindrical portion 26, and a base 28. Base 28 slopes downwardly and radially inwardly to an opening or aperture 30 located centrally as a vapor inlet through the base of the vent plug and as a drainage passage for return of splashed electrolyte guided down the slopes of base 28 back to one of the cells.

A thin tubular skirt or cylindrical baffle 32 extends downwardly from cap portion 22 and terminates radially outwardly of and above the aperture 30 in base 28. An aperture 34 is located radially outwardly of the baffle at one side in the cap portion 22 and forms an exhaust vent. Previously this exhaust vent 34 has been stuffed with a pipe-cleaner-type of closure when the vent plug is fitted to a dry charge battery to be shipped and stored. This pipe cleaner type of closure consisted generally of a twisted wire core carrying a textile or bristle type of resilient material that engaged and sealed the vent 34. The pipe cleaner type closure, however, often is not removed manually when electrolyte is added to the dry charge battery after shipment and storage. Then fumes and splashed acid dissolved both the textile material and metal core with the latter being harmful to the life of the battery since metallic material is drained back to the cell through aperture 30 along with the splashed acid or electrolyte. Furthermore, the bristles do not provide a very effective seal to keep humid atmosphere out of the dry cell during shipment and storage of the battery. Metallic material can also clog either of the apertures 30 or 34 by accumulation of residue.

In the present invention as is readily seen in Fig. 2 the vent plug and method of use therefore include provision of a moisture barrier that protects against entry of humid atmosphere and foreign material including dust and damaging metallic elements. This barrier comprises a hole-sealing member of cellulose or filter-paper-type material shaped as a disc generally indicated by numeral 40 in Figures 2, 3, and 4.

The filter-paper-type disc may be made of pure cellulose, cotton linter paper material or any material which completely disintegrates due to acid spray after the dry charge battery is filled with electrolyte. The disc 40 includes a central body portion or annular mid-piece 42 illustrated in Figure 4 which is a view taken in the direction of arrow 4 in the exploded view of Fig. 3. Extending radially outwardly from the body portion 42 are a plurality of legs or arcuate segments 44 separated from each other by radially inwardly extending slots or grooves 46. Each of the arcuate segments is joined at its radial inner end to body portion 42. The diameter of body portion 42 exceeds the diameter of aperture 30 so as to provide a barrier for blocking passage of atmosphere into any cell through aperture 30 after heating and drying out of the cell and fitting of the vent plug into filler opening 16 as the dry charge battery is manufactured. As air inside the cell cools and contracts, atmospheric pressure outside the cell is greater against the top surface 48 of body portion 42 than the pressure of a partial vacuum inside each cell.

Sealing of body portion 42 over aperture 30 also is urged by inherent resilience of the cellulose material legs or segments 44 because the outer edges 49 thereof have a diameter greater than a diameter of an inner surface 50 of lower barrel portion 24. This diametric relationship is evident in the exploded view of Fig. 3 and by spring-disc type cupping of member 40 due to pivotal engagement of edges 49 of the legs or segments 44 against the inner peripheral surface 50 of lower barrel portion 24 as shown in the vent plug assembly of Fig. 2. Atmospheric pressure above disc 40 is supplied through exhaust vent 34 upon cooling of air in each dry charge battery cell. Humid atmosphere, moisture and foreign material is prevented from entering each cell by the filter-paper-type disc 40 since there is a lower pressure or partial vacuum in each cell with atmospheric pressure urging disc sealing.

The disc or hole-sealing member 40 is inserted over base 28 to cover aperture 30 in the bottom of barrel portion 24 as the vent plug is assembled as represented in Figures 2 and 3. A sealed juncture 52 is formed between an outer peripheral edge 43 of cap portion 22 and an upper annular edge 54 of the cylindrical portion 26 of lower cup-like portion 21. A radially outwardly extending abutment or shoulder 56 is provided adjacent a connection uniting barrel portion 24 and cylindrical portion 26. The abutment 56 limits insertion of the vent plug into filler opening 16 by engagement of threaded portions 58 and 58a of the barrel portion and of cell cover 18 respectively.

Use of the vent plug with a barrier of cellulose type material provides an improved method of sealing a dry charge battery since absorption of moisture by the filter-paper-type of material causes a swelling to increase pressure of the seal as edges 49 pivotally engage the inner surface 50 of barrel portion 24 and further urge body portion 42 to close off the aperture 30.

After shipment and storage the cell can be filled with electrolyte. Since humid atmosphere was kept out of the cell, full charge capacity is assured. Fumes and acid splashed from the cell will disintegrate the material of which the disc is made. Complete disintegration need not occur immediately and can take as long as three months. In the interim, the slots 46 of member or restrictor 40 also permit passage of the splashed acid relative to aperture 30 and prevent bubbling and clogging due to excess paper or cellulose material before the restrictor or barrier member is completely disintegrated.

The discs 40 preferably are punched out of flat sheet material into a shape shown by the plan view of Fig. 4. Since no pipe-cleaner-type of closure is used, there is no metal core and no labor is required to remove a moisture barrier from the vent plug for dry charge batteries when electrolyte is added initially.

As is readily seen in Fig. 2, the vent plug lower portion 21 and cap portion 22 form a cylindrical inner chamber 60 and an annular outer chamber 62 separated by baffle 32 except for an annular connecting space 64 between a lower peripheral edge 65 of the baffle in close proximity to base 28. In this manner effluent or spalshed acid or fumes entering the plug are initially directed upwardly into the dome-like chamber 60 and against considerable baffle surface area serving to reverse direction of flow tending to drain liquid back to the cell through aperture 30 but permitting ventilation through exhaust vent 34.

It is obvious that the humidity restrictor or disc 40 can be made in various other shapes, sizes, or configurations without departing from the spirit of the invention.

While the embodiments of the present invention as herein disclosed constitute preferred forms, it is to be understood that other forms might be adopted.

What is claimed is as follows:

1. A method of sealing a battery which is shipped and stored in a dry condition after heating and drying out of cells during manufacture, the steps comprising, providing completely within a vent plug of acid-resistant material a humidity restrictor of cellulose material that disintegrates due to battery electrolyte, fitting the vent plug with the enclosed humidity restrictor into a filler opening while each battery cell is still warm from the drying out, covering over a vent passage in the plug with the humidity restrictor in complete sealing relationship to the vent passage due to atmospheric pressure outside the cell being greater than pressure inside the cooled cell during shipping and storing, and disintegrating the humidity restrictor within the vent plug with fumes and/or acid splashed from the cell subsequent to addition of electrolyte to each cell for use of the battery.

2. A method of protecting a dry charge battery after manufacture resulting in dried out cells for shipment and storage prior to addition of electrolyte for battery use, the steps comprising, providing completely within a vent plug of acid-resistant material a moisture barrier of cellulose material which disintegrates after electrolyte is filled into each cell, and blocking a vent plug passage completely with the cellulose material barrier to maintain each cell in dried out condition during battery shipment and storage free of battery deterioration prior to disintegration of the cellulose material barrier to open the vent passage due to addition of electrolyte to each cell for battery use and for effecting disintegration of the cellulose material.

3. A dry charge battery cell vent plug adapted for use during shipment and storage of a dry charge battery in dry and undeteriorating condition, the combination comprising, a unitary vent plug body formed of a moldable acid-resistant material and adapted to be removably secured in an opening of a battery cell wall or the like, including an upper inverted cap portion having a downwardly extending cylindrical baffle, a lower cup-like portion secured to said cap portion and having a base extending radially inwardly sloping downwardly from said lower portion to terminate in an aperture for inlet of vapor and electrolyte drain-off, said cap portion having an exhaust vent located radially outside said cylindrical baffle, and a hole-sealing member of a material adapted to be disintegrated by fumes and acid splash from electrolyte added to the battery, said hole-sealing member being assembled completely inside said plug body in a location adjacent to the base aperture to close off the battery cell completely to humid atmosphere during shipment and storage of the dry charge battery while during use of the battery containing added electrolyte said member is disintegrated to eliminate a special removal operation though loss of the electrolyte is prevented by said baffle.

4. A battery cell vent plug adapted for use during shipment and storage of a dry charge battery in dry condition, the combination comprising, an upper annular cap portion of acid-resistant material, a baffle extending downwardly from said cap portion at a location near an exhaust vent through said cap portion, a lower cup-like portion of acid-resistant material secured to said cap portion and having a base with a vapor inlet and electrolyte drain-off passage, and an annular cellulose-material sealing disc assembled to be totally inside said plug to prevent ingress of humid atmosphere to the battery by way of the base passage through the exhaust vent fully sealed during shipment and storage, said cellulose-material disc being disintegrated during the course of battery use by fumes and acid splash through the base passage from electrolyte added to the dry charge battery for use thereof free of any necessity of providing a special removal of said sealing disc.

5. The disc of claim 4 having an outer diameter greater than an inner diameter of said vent plug lower portion, outer peripheral portions of said disc pivotally engaging an inner peripheral surface of said lower portion and thereby resiliently biasing said disc in sealing relationship against said base thereby supplementing sealing effected by outside atmospheric pressure that is greater than an inside pressure left in what amounts to a partial vacuum as the dry charge battery cools off from a higher temperature used to dry out the battery during manufacture, and an arcuate central body portion of said disc having a greater diameter than a diameter of the base passage to close off the passage sealed completely during shipment and storage.

6. For a dry charge battery vent plug of acid-resistant material assembled into a unitary structure including a cap portion having an exhaust vent and a lower portion having a vapor inlet and electrolyte drain-off passage, a vent-plug hole-sealing member of cellulose filter-paper-type material that disintegrates due to fumes and/or acid splashed from electrolyte-filled cells of a dry charge battery, comprising, a central body portion for covering and completely sealing the vapor inlet and drain-off passage only during shipment and storage to prevent fully ingress of humid atmosphere which is detrimental to the battery, and a plurality of arcuate segments extending radially ouwardly from said body portion, said segments being adapted to seat said disc resiliently completely inside the vent plug and being separated from each other by radially inwardly extending slots which prevent electrolyte bubbling and clogging of the vapor inlet and electrolyte drain-off passage until said cellulose-material disc is completely disintegrated naturally after the battery is filled with electrolyte for use.

7. A method of completely sealing a battery temporarily during only shipping and storage in a dry condition after heating and drying out of cells during manufacture the steps comprising, providing a vent plug in which there is a vent-plug-hole-sealing member of cellulose filter-paper-type material that disintegrates due to fumes, and that includes a central body portion with radially extending resilient leg-like segments, biasing the body portion of the vent-plug hole-sealing member relative to a passage of the vent plug completely closed off by means both including a resilient cupping effected by engagement of the resilient segments relative to a peripheral wall defining a space smaller dimensionally than an over-all lateral dimension of the hole-sealing member and including differential pressure obtained also to urge sealing of the body portion relative to a vent hole because outside atmosphere pressure on the body portion is greater than that left in what amounts to a partial vacuum inside the battery as the latter cools off from a higher temperature used to heat and dry out the battery during manufacture, maintaining a completely sealed relationship of the body portion covering a vent hole during said biasing, and disintegrating the cellulose hole-sealing member within the vent plug with fumes and/or acid splashed from battery cells subsequent to addition of electrolyte to each cell for actual use of the battery.

References Cited in the file of this patent
UNITED STATES PATENTS

| | | |
|---|---|---|
| 1,329,181 | Holland et al. | Jan. 27, 1920 |
| 1,468,259 | Carpenter | Sept. 18, 1923 |
| 1,816,035 | Woodbridge | July 28, 1931 |